(12) United States Patent
Hatahori et al.

(10) Patent No.: US 11,977,032 B2
(45) Date of Patent: May 7, 2024

(54) DISPLACEMENT MEASUREMENT DEVICE AND DEFECT DETECTION DEVICE

(71) Applicant: Shimadzu Corporation, Kyoto (JP)

(72) Inventors: Takahide Hatahori, Kyoto (JP); Kenji Takubo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 374 days.

(21) Appl. No.: 17/413,401

(22) PCT Filed: Jan. 29, 2019

(86) PCT No.: PCT/JP2019/002868
§ 371 (c)(1),
(2) Date: Jun. 11, 2021

(87) PCT Pub. No.: WO2020/157817
PCT Pub. Date: Aug. 6, 2020

(65) Prior Publication Data
US 2022/0034822 A1 Feb. 3, 2022

(51) Int. Cl.
*G01N 21/88* (2006.01)
*G01B 9/02* (2022.01)
*G01N 29/24* (2006.01)

(52) U.S. Cl.
CPC ..... *G01N 21/8806* (2013.01); *G01B 9/02095* (2013.01); *G01N 29/2418* (2013.01); *G01N 2021/8838* (2013.01)

(58) Field of Classification Search
CPC .......... G01N 21/8806; G01N 29/2418; G01N 2021/8838; G01B 9/02095; G01B 9/02098; G01H 9/00
See application file for complete search history.

(56) References Cited

U.S. PATENT DOCUMENTS

| 2011/0317172 | A1* | 12/2011 | Tamiya | G01B 11/2441 356/614 |
| 2014/0300893 | A1* | 10/2014 | Ogawa | G01N 21/8806 356/237.2 |

(Continued)

FOREIGN PATENT DOCUMENTS

| JP | 2007024674 A | 2/2007 |
| JP | 2017-207445 A | 11/2017 |

(Continued)

OTHER PUBLICATIONS

Written Opinion of the International Searching Authority (ISA237) for PCT application No. PCT/JP2019/002868 dated Apr. 16, 2019, submitted with a machine translation.

(Continued)

*Primary Examiner* — Tarifur R Chowdhury
*Assistant Examiner* — Carlos Perez-Guzman
(74) *Attorney, Agent, or Firm* — Muir Patent Law, PLLC (57) ABSTRACT

A displacement measurement device 10 is provided with: a laser light source 11 for emitting laser light to a measurement area R of a measurement target object S; a focusing optical system (the beam splitter 151, the first reflecting mirror 1521, the condenser lens 155) having a front focal point in the measurement area R and a rear focal point on a predetermined imaging surface (the detection surface 1561); a non-focusing optical system (the beam splitter 151, the diffuser 153, the second reflecting mirror 1522, and the condenser lens 155) in which light from a measurement area R of a correspondence point in the measurement area corresponding to each point of the imaging surface with respect to the focusing optical system is incident on the point of the imaging surface; and a photodetector (image sensor 156) configured to detect light intensity on the imaging surface for each point. Thus, corresponding to each of a large number of points in the measurement area R, main (Continued)

reflected light reflected at the point and reference light reflected at the surrounding range of the point are incident on each of a large number of points in the imaging surface, and the main reflected light and the reference light interfere at a large number of points in the imaging surface. Thus, an interference pattern is obtained.

10 Claims, 5 Drawing Sheets

(56) References Cited

U.S. PATENT DOCUMENTS

| | | |
|---|---|---|
| 2017/0350690 A1 | 12/2017 | Hatahori et al. |
| 2018/0283847 A1 | 10/2018 | Hatahori et al. |
| 2019/0234911 A1* | 8/2019 | Murray .................. G01N 29/00 |

FOREIGN PATENT DOCUMENTS

| | | |
|---|---|---|
| JP | 2017219318 A | 12/2017 |
| JP | 2018-169204 A | 11/2018 |

OTHER PUBLICATIONS

Notice of Allowance dated May 30, 2023 issued for the corresponding Japanese Patent Application No. 2020-568906.
Second Office Action dated Jan. 10, 2023, for corresponding Japanese Patent Application No. JP 2020-568906.
First Office Action dated May 17, 2022 for corresponding Japanese Patent Application No. JP 2020-568906.
First Office Action dated Jan. 29, 2024 issued for the corresponding Chinese Patent Application No. 201980088598.5.

* cited by examiner

DISPLACEMENT MEASUREMENT DEVICE AND DEFECT DETECTION DEVICE

TECHNICAL FIELD

The present invention relates to a displacement measurement device for measuring a displacement distribution occurring in a measurement target object and a defect detection device using the displacement measurement device.

BACKGROUND OF THE INVENTION

As a device for measuring a distribution of a displacement that occurred in a measurement target object, a device utilizing speckle interferometry or speckle-shearing interferometry has been proposed. In the speckle interferometry, laser light from a laser light source is branched into illumination light and reference light, the illumination light is emitted to a measurement area, and an interference pattern caused by reflected light in which the illumination light is reflected at each point on a surface of the measurement target in the measurement area and the reference light is obtained. In the speckle-shearing interferometry (see e.g., Patent Document 1), the measurement area is illuminated using laser light from a laser light source, and an interference pattern by the light reflected from two adjacent points on the surface of the measurement target object in the measurement area is obtained. In the speckle-shearing interferometry, at each measurement point on the surface of the measurement target object in the measurement area, the light reflected at the measurement point corresponds to the "reflected light" described above, and the light reflected from one nearby point corresponds to the reference light. In this way, in the speckle-shearing interferometry, since the reference light is also the light reflected by the surface of the measurement target object, in order to clarify the distinction from the reference light, hereinafter, the light reflected by the measurement point is referred to as the "main reflected light".

In these displacement measurement devices, the image of the interference pattern is captured with a CCD camera or the like before and after applying vibration, force, heat, etc., to the measurement target object, and the distribution of the displacement in the measurement area is calculated from two images.

Further, by utilizing the fact that a distribution of a displacement becomes discontinuous at a point of a defect in a case where the defect is present in the measurement area of the measurement target object, the above-described displacement measurement device can be used as a defect detection device for detecting a defect present in the measurement area based on the obtained distribution of the displacement in the measurement area.

In the speckle interferometry, the optical path of reflected light and the optical path of the reference light differs greatly, and therefore the optical system becomes complex. Further, it is susceptible to environmental disturbances because the path environment of the reflected light and that of the reference light differ. On the other hand, in the speckle-shearing interferometry, the main reflected light and the reference light are reflected at two adjacent points on the surface of the measurement target object and pass through almost the same optical path. For this reason, there is an advantage that the optical system can be made simpler than the speckle interferometry and that the detection sensitivity at the time of detecting a defect can be enhanced because it is less susceptible to environmental disturbances.

PRIOR ART DOCUMENT

Patent Document

Patent Document 1: Japanese Unexamined Patent Application Publication No. 2017-219318

SUMMARY OF THE INVENTION

Problems to be Solved by the Invention

In the speckle-shearing interferometry, at each measurement point in a measurement area, an infinite number of points proximate to the measurement point can be taken in the measurement area. In actuality, however, the light reflected by one point positioned spaced apart by a specified distance in one direction (shear direction) determined by the configuration of the interference optical system is used as reference light. Therefore, at each measurement point, the relative displacement between the measurement point and one point spaced apart from the measurement point is obtained as the displacement of the measurement point. Therefore, in a case where a relative displacement between two points is present largely in a particular direction and the direction does not coincide with the shear direction, the displacement is measured to be small. In this respect, there is room for further improving the detection sensitivity when detecting a defect using speckle-shearing interferometry.

The problems to be solved by the present invention is to provide a displacement measurement device capable of measuring a distribution of displacements occurring in a measurement target object, without being affected by the difference in the orientation of a point where reference light is reflected, and a defect detection device using the displacement measurement device.

Means for Solving the Problem

A displacement measurement device according to the present invention made to solve the above-described problems, includes:
- a laser light source configured to emit laser light to a measurement area on a surface of a measurement target object;
- a focusing optical system having a front focal point in the measurement area and a rear focal point on a predetermined imaging surface;
- a non-focusing optical system in which light from a surrounding range of a correspondence point in the measurement area corresponding to each point of the imaging surface with respect to the focusing optical system is incident on the point of the imaging surface; and
- a photodetector configured to detect light intensity on the imaging surface for each point.

According to the above-described displacement measurement device, the reflected light from a certain point in the measurement area is incident on a predetermined point of the imaging surface by the focusing optical system. Further, by the non-focusing optical system, the light from the surrounding range of the one point in the measurement area is incident on the same point of the imaging surface. The former corresponds to the main reflected light in speckle-shearing interferometry, and the latter corresponds to the reference light. In this way, the main reflected light and the reference light incident on the same point of imaging surface interfere with each other. At each point of the imaging surface, the intensity of the interference light is detected by the photodetector. The intensity of the interference light at one point of the imaging surface reflects the difference between the displacement of the correspondence point in the measurement area corresponding to the point and the average displacement of the surrounding range of the correspondence point. Therefore, the directional dependency of the measurement result that was generated by conventional speckle-shearing interferometry can be prevented by the above-described displacement measurement device. In the above-described displacement measurement device, based on the intensity of this interference light, that is, the light intensity detected by the photodetector, the distribution of displacements is collectively measured for each measurement point in the measurement area.

Note that the focusing optical system and the non-focusing optical system may share (commonly owns) a part thereof. The "surrounding range of the correspondence point of the measurement area" may be a range including the correspondence point, a range excluding the correspondence point, or a range excluding the corresponding point and a predetermined range (narrower than a range defined by the outer edge of the surrounding range) from correspondence point.

In the above-described displacement measurement device according to the present invention, the non-focusing optical system may include a converging optical system (convex lens system) having a front focal point in the measurement area and a rear focal point on the imaging surface, and a diffusion element configured to diffuse light, the diffusion element being arranged between the converging optical system and the measurement area or arranged in the converging optical system. With this, the light from the surrounding range of the correspondence point in the measurement area is diffused by the diffusion plate of the non-focusing optical system, and at the imaging surface, a part of this diffused light is incident on the same point on which the light is incident from the correspondence point by the focusing optical system.

Further, the non-focusing optical system may be a converging optical system having a front focal point in front or rear of the measurement area and a rear focal point on the imaging surface. That is, the displacement measurement device according to the present invention of this case, includes:
  a laser light source configured to emit laser light to a measurement area on a surface of a measurement target object;
  a focusing optical system having a front focal point in the measurement area and a rear focal point on a predetermined imaging surface;
  a non-focusing optical system having a front focal point in front or rear of the measurement area and a rear focal point on the imaging surface; and
  a photodetector configured to detect light intensity on the imaging surface for each point.

Note that the position of the front focal point of the non-focusing optical system having a rear focal point at a certain point on the imaging surface in a plane parallel to the measurement area does not necessarily coincide with the position of the front focal point of the focusing optical system having a rear focal point at the one point. It is desirable that the position of the front focal point of the focusing optical system having a rear focal point at one point on the imaging surface exists in the cross-section in the measurement area of the light flux of the non-focusing optical system having a rear focal point at the one point.

A defect detection device according to the present invention includes:
  an excitation unit configured to excite an elastic wave to a measurement target object;
  a laser light source configured to emit laser light to a measurement area on a surface of the measurement target object;
  a focusing optical system having a front focal point in the measurement area and a rear focal point on a predetermined imaging surface;
  a non-focusing optical system in which light from a surrounding range of a correspondence point in the measurement area corresponding to each point on the imaging surface with respect to the focusing optical system is incident on the point of the imaging surface; and
  a photodetector configured to detect light intensity on the imaging surface for each point.

In a case of using a non-focusing optical system having a front focal point in front or rear of the measurement area and a rear focal point on the imaging surface, a defect detection device according to the present invention includes:
  an excitation unit configured to excite an elastic wave to a measurement target object;
  a laser light source configured to emit laser light to a measurement area on a surface of the measurement target object;
  a focusing optical system having a front focal point in the measurement area and a rear focal point on a predetermined imaging surface;
  a non-focusing optical system having a front focal point in front or rear of the measurement area and a rear focal point on the imaging surface; and
  a photodetector configured to detect light intensity on the imaging surface for each point.

According to the defect detection device of the present invention, it is possible to detect a defect in the measurement area by collectively measuring the distribution of displacements in the measurement area for each measurement point based on the intensity acquired by the photodetector by the same method as in the displacement measurement device and acquiring the position where the displacement discontinuously changes. In this case, since there is no directional dependency in the displacement measurement result of the measurement area, it can be detected with the same sensitivity in any direction of defects.

In the defect detection device according to the present invention, it is preferable to configure to further include
  a control unit configured to perform control of acquiring light intensity from the photodetector in at least three phases that differ in an elastic wave with each other, by controlling a phase of the elastic wave and a timing of the stroboscopic illumination,
  wherein the laser light source is configured to perform stroboscopic illumination of laser light to the measurement area.

When the distribution of defects only in one phase of an elastic wave is measured, at the measurement point where the amplitude of the elastic wave is small, the difference in the amplitude due to the presence of the defect also becomes small. Therefore, it is difficult to detect that the displacement changes discontinuously, resulting in reduced detection accuracy. On the other hand, by measuring the distribution of displacements based on the light intensity acquired in at least mutually different three phases of an elastic wave, it is possible to reproduce the total vibration state of the elastic wave at any measurement point, which can increase the detection accuracy of a defect.

Effects of the Invention

According to the present invention, a displacement that occurred in a measurement target object can be measured without being affected by the difference in the position of the point at which reference light reflects.

EMBODIMENTS FOR CARRYING OUT THE INVENTION

Figure 1:
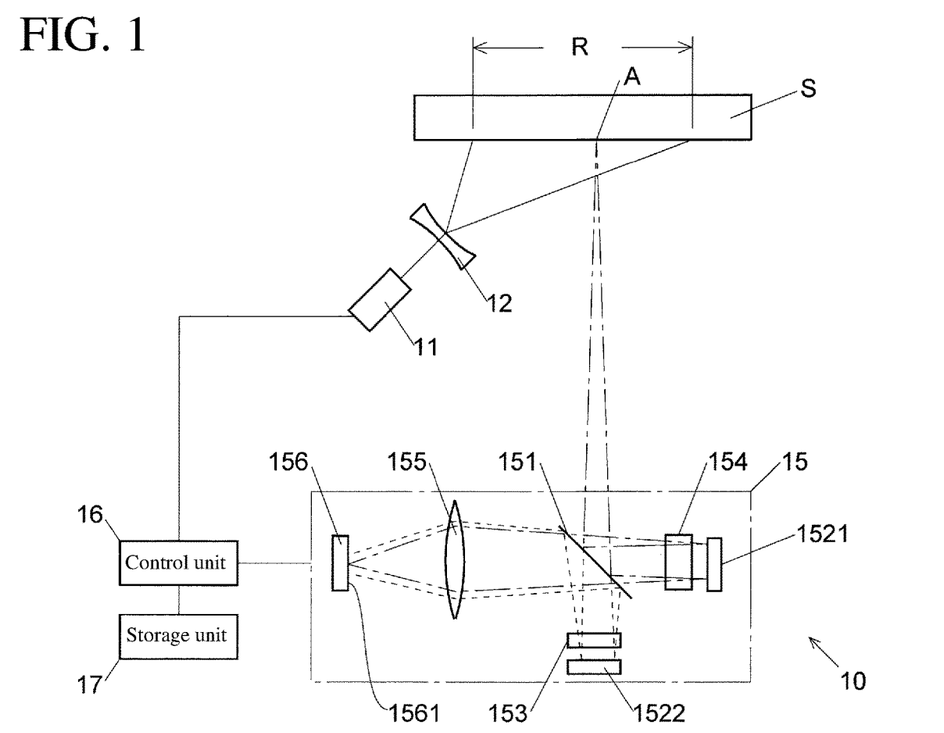
FIG. 1 is a schematic configuration diagram showing a first embodiment of a displacement measurement device according to the present invention.

Embodiments of a displacement measurement device and a defect detection device according to the present invention will be described with reference to FIG. 1 to FIG. 7.
(1) Displacement Measurement Device of First Embodiment FIG. 1 is a schematic configuration diagram of a displacement measurement device 10 of a first embodiment. The displacement measurement device 10 is provided with a laser light source 11, an illumination light lens 12, an interferometer 15, a control unit 16, and a storage unit 17.

The laser light source 11 is a light source for outputting laser light and emits the laser light to a measurement target object S. The illumination light lens 12 is a concave lens arranged between the laser light source 11 and the measurement target object S and has a role of expanding the laser light to the entire measurement area R on the surface of the measurement target object S.

The interferometer 15 is composed of a beam splitter 151, a first reflecting mirror 1521, a second reflecting mirror 1522, a diffuser (diffusion element, diffusion plate)153, a phase shifter 154, a condenser lens 155, and an image sensor 156.

The beam splitter 151 is a half mirror placed at a position on which the illumination light reflected by the measurement area R is incident. The first reflecting mirror 1521 is arranged on the optical path of the illumination light reflected by the beam splitter 151, and the second reflecting mirror 1522 is arranged on the optical path of the illumination light transmitted through the beam splitter 151.

The diffuser 153 is arranged between the beam splitter 151 and the second reflecting mirror 1522 to diffuse the light transmitted through the diffuser 153. When the beam of light is made to be incident on the diffuser 153, the diameter of the beam of the light transmitted through the diffuser 153 becomes larger than that when the beam of the light is made to be incident. As such a diffuser, a transparent substrate made of glass or resin provided with irregularities on a surface of the substrate, and a substrate in which a distribution of a refractive index is formed therein, can be exemplified. Concrete examples thereof include a ground glass, a holographic diffuser, a microlens array, an opal glass, and a spatial modulator. Equivalent effects can also be achieved by using a conical shape prism to converge or diverge the light slightly.

The phase shifter 154 is arranged between the beam splitter 151 and the first reflecting mirror 1521 to change (shift) the phase of the light passing through the phase shifter 154. Note that in the configuration shown in FIG. 1, the phase shifter 154 is a passage type phase shifter, but the present invention can be realized by using other types of phase shifters. For example, it may be configured to add a mechanism for changing the position of the reflecting mirror 1521 in place of the phase shifter to also function as the phase shifter. Also, the arrangement of the phase shifter 154 is not limited to the position shown in FIG. 1. It may be arranged between the beam splitter 151 and the diffuser 153, or between the diffuser 153 and the second reflecting mirror 1522. It may be configured such that the position of the reflecting mirror 1522 is variable.

The image sensor 156 is arranged on the optical path of the illumination light (this light corresponds to the "main reflected light" as described below) and that of the illumination light (this light corresponds to the "reference light"). The former illumination light is reflected by the beam splitter 151, reflected by the first reflecting mirror 1521, and then transmitted through the beam splitter 151. The latter illumination light is transmitted through the beam splitter 151, transmitted through the diffuser 153, reflected by the second reflecting mirror 1522, transmitted through the diffuser 153 again, and then reflected by the beam splitter 151.

The condenser lens 155 is arranged between the beam splitter 151 and the image sensor 156 and is a lens for making the main reflected light from one point in the measurement area R incident on one point of the detection surface 1561. The beam splitter 151, the first reflecting mirror 1521, and the condenser lens 155 constitute a focusing optical system having a front focal point at the point in the measurement area R and a rear focal point on the point on the detection surface 1561. Therefore, the detection surface 1561 corresponds to the above-described imaging surface. On the other hand, the beam splitter 151, the diffuser 153, the second reflecting mirror 1522, and the condenser lens 155 constitute a non-focusing optical system in which the light from the surrounding range of the point of the measurement area R corresponding to the point in the detection surface 1561 is incident on the detection surface 1561.

The control unit 16 controls the operation of the laser light source 11, the phase shifter 154 and the image sensor 156. The storage unit 17 stores the data obtained by the image sensor 156.

Next, with reference to FIG. 2, the reason why the interference pattern of the main reflected light and the reference light is obtained in the displacement measurement device 10 of the present embodiment will be described.

Figure 2:
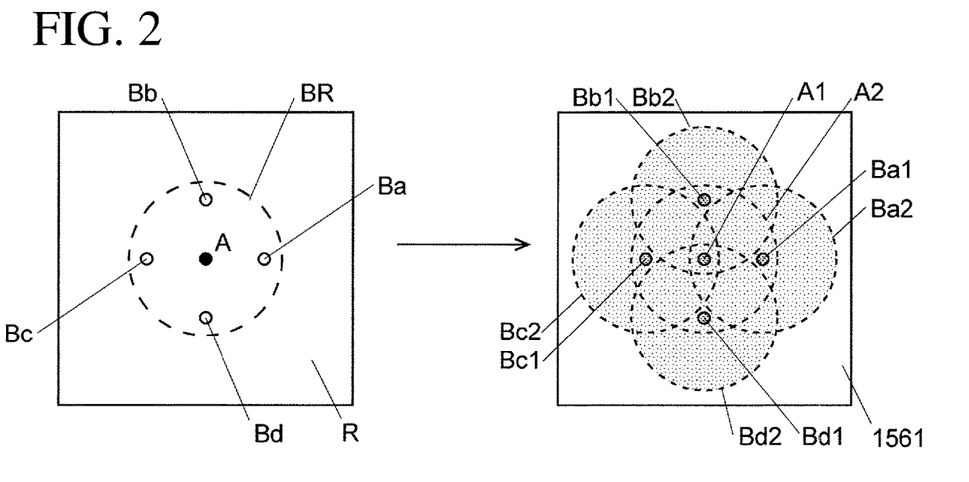
FIG. 2 shows the relation between the light reflected at a point in a measurement area and the light incident on a detection surface of a detector in the displacement measurement device of the present embodiment.

In the exemplary embodiment shown in FIG. 2, the main reflected light from the point A in the measurement area R is incident on the point A1 on the detection surface 1561 by the focusing optical system. On the other hand, the light from the point Ba existing around the point A in the measurement area R is diffused by the diffuser 153 of the non-focusing optical system to spread from the point Ba1 corresponding to the point Ba to the range Ba2, and is incident on the detection surface 1561 as reference light. When the distance between the point A and the point Ba in the measurement area R is within a predetermined range (surrounding range BR), the point A1 is present in the range Ba2 in the detection surface 1561. In addition, like the point Ba, the reference light from the point Bb, Bc, Bd, . . . , present in the surrounding range BR from the point A in the measurement area R also spreads and is incident on the range Bb2, Bc2, Bd2, . . . , including the point A1 from the point Bb1, Bc1, Bd1, . . . , corresponding to each point Bb, Bc, Bd, . . . , in the detection surface 1561. Therefore, the main reflected light from the point A in the measurement area R and the reference light reflected by the surrounding range BR (including the point Ba1, Bb1, Bc1, Bd1, . . . ) of the point A in the measurement area R are incident on the point A1 in the detection surface 1561.

Further, similarly, from the points in the measurement area R other than the point A, the main reflected light is incident on the point of the detection surface 1561 corresponding to the point in the measurement area R by the focusing optical system, and the reference light reflected in the surrounding range of the point in the measurement area R is incident on the point of the detection surface 1561 by the non-focusing optical system. For example, the light incident on the detection surface 1561 by the non-focusing optical system from the point A spreads from the point A1 to the range A2 and is incident on the detection surface 1561 and becomes reference light from points other than the point A in the measurement area R to the main reflected light.

Thus, corresponding to each of the numerous points in the measurement area R, the main reflected light reflected at the point and the reference light reflected on the surrounding range of the point are incident on each of the numerous points in the detection surface 1561, and the main reflected light and the reference light interfere at each point of the detection surface 1561. The intensity of the interference light for each point of the detected detection surface 1561 is stored in the storage unit 17. In this way, the interference pattern is obtained by detecting the intensity of the interference light at each point of the detection surface 1561 of the image sensor 156.

When a distortion is caused in the measurement area R by the action of vibration, force, heat, etc., of the measurement target object S, a change occurs in the optical path difference between the point in the measurement area R at which the main reflected light is reflected and the point surrounding range of the point by the action. Therefore, a change occurs in the intensity of the interference light of the reference light reflected at the point in the surrounding range and the main reflected light. Therefore, by acquiring the interference pattern before and after the application of the above-described action, respectively, and comparing them, it is possible to measure the distortion of the measurement target object S due to the above-described action. At this time, the reference light is the light reflected in the surrounding range rather than one point, and therefore, the directional dependency of the measurement result that occurred in conventional speckle-shearing interferometry using reference light from one point does not occur in the displacement measurement device 10 of the present embodiment.

In the displacement measurement device 10 of this embodiment, as a means for calculating the displacement distribution, a phase shift method may be used. Specifically, the main reflected light or the reference light is caused to pass through the phase shifter to acquire at least three values different in the shift amount by the phase shifter. Of course, both the main reflected light and the reference light may be caused to pass through the phase shifter to relatively change both the phases. By acquiring the phase difference of the main reflected light and the reference light based on the optical intensity of the interference light acquired according to the phase shift amount, it is possible to calculate the displacement of the surface in the measurement area. In addition, as a technique for capturing the displacement of the surface, a spatial Fourier transform method or a sum difference method may be used.

(2) Defect Detection Device of First Embodiment

Figure 3:
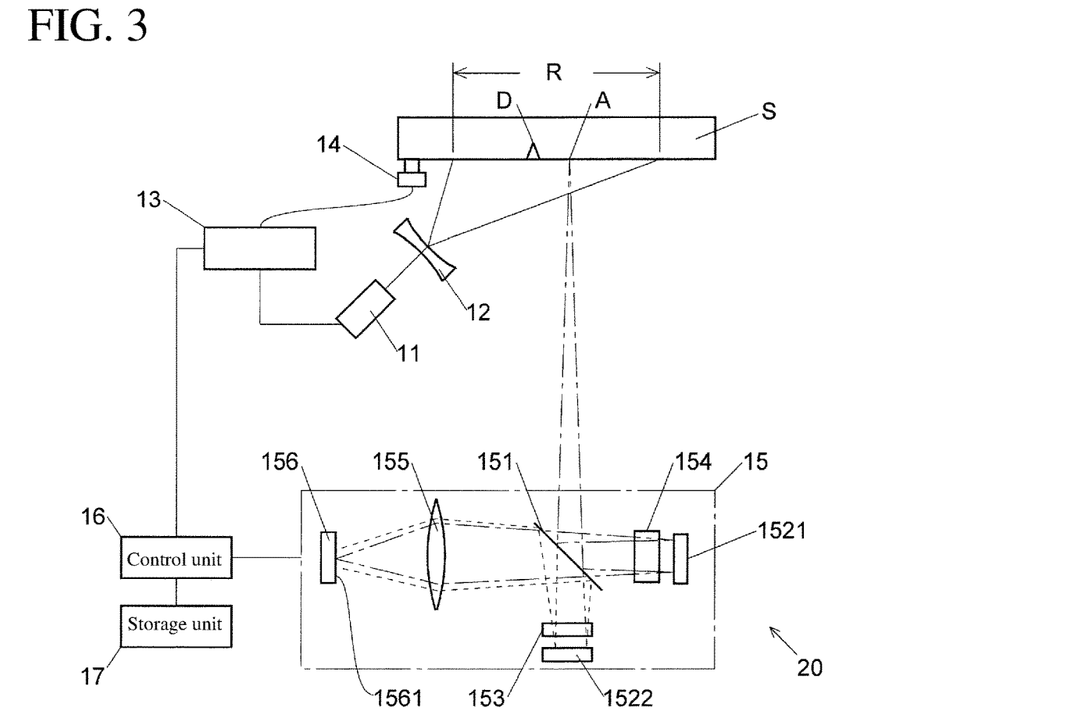
FIG. 3 is a schematic configuration diagram showing a first embodiment of the defect detection device according to the present invention.

Next, the configuration of a defect detection device 20 of the first embodiment will be described with reference to FIG. 3. The defect detection device 20 has a configuration in which a signal generator 13 and a vibrator 14 are added to the displacement measurement device 10 of the first embodiment.

The signal generator 13 is connected to the vibrator 14 to generate and transmit an AC electric signal to the vibrator 14. The vibrator 14 is used in contact with the measurement target object S and receives the AC electric signal from the signal generator 13 and converts it to mechanical vibrations to impart the mechanical vibrations to the measurement target object S. The signal generator 13 and the vibrator 14 correspond to the above-described excitation unit.

The signal generator 13 is also connected to the laser light source 11 and transmits a pulsed electrical signal (pulse signal) to the laser light source 11 at a timing at which the AC alternating electric signal becomes a predetermined phase. The laser light source 11 emits pulsed laser light at the timing at which the pulse signal is received.

The control unit 16 controls the operation of the signal generator 13, the phase shifter 154, and the image sensor 156. Note that the control for the laser light source 11 is performed via the signal generator 13 and therefore, is not performed directly by the control unit 16.

The constituent elements other than the vibrator 14, the control unit 16, and the signal generator 13 are similar to those of the displacement measurement device 10 of the first embodiment.

The operation of the defect detection device 20 of the first embodiment will now be described. The signal generator 13 transmits an AC electric signal to the vibrator 14, so that the vibrator 14 imparts mechanical vibrations to the measurement target object S having the same period and phase as those of the AC current signal. With this, in the measurement target object S, elastic waves having the same period as that of the AC current signal is excited.

At the same time, the signal generator 13 transmits a pulse signal to the laser light source 11 at the timing at which the AC current signal becomes a predetermined phase. With this, the laser light source 11 emits pulsed laser light at the timing at which the pulse signal is received and emits the laser light in the measurement area R of the measurement target object S through the illumination light lens 12. At each point in the measurement area R, each time the laser light is emitted from the laser light source 11, the laser light is reflected. The reflected laser light is incident on each point on the detection surface 1561 of the image sensor 156 corresponding to each point as main reflected light, and the reference light reflected in the surrounding range of each point in the measurement area R is incident on each point in the detection surface 1561 corresponding to each point. With this, each time the pulsed laser light is emitted from the laser light source 11, the interference pattern is obtained.

Here, the timing at which the laser light is emitted corresponds to the phase of the AC current signal generated by the signal generator 13, and the elastic wave is excited to the measurement target object S at the same period and phase as those of the AC current signal. Therefore, the interference pattern is repeatedly acquired at the timing at which this elastic wave is in a predetermined phase. That is, the interference pattern is repeatedly acquired at the timing at which the elastic wave is in a predetermined phase. That is, the interference pattern reflects the distribution of the displacement on a surface in the measurement area R when the elastic wave is in a specific phase (note that the phase differs from the phase of the laser light). When a defect D is present in the measurement area R, the discontinuity occurs in the interference pattern in the phase in the vicinity of the defect D. Thus, it is possible to detect the defect D based on this interference pattern.

Note that, similarly to the case of the above-described displacement measurement device 10, also in this defect detection device 20, by shifting the phase of the main reflected light with the phase shifter 154, it is possible to use a phase shift method for acquiring the interference pattern in three or more different phases.

In the operation of the defect detection device 20 described above, as described above, the interference pattern reflecting the distribution of the displacement of the measurement area R when the vibration of the elastic wave is in a particular one phase is obtained. Therefore, at the point in the measurement area R that is close to the vibration node when the vibration of the elastic wave is in this particular phase, the amplitude of the vibration is small and the detection accuracy of the defect is low. Therefore, by acquiring the interference pattern by the image sensor 156 by emitting pulse-shaped laser light to the measurement area R in the three or more phases different in the AC electric signal by changing the timing at which the pulse signal is transmitted to the laser light source 11 from the signal generator 13. With this, three or more parameters can be acquired, and therefore the entire status of the vibration can be reproduced.

Figure 4:
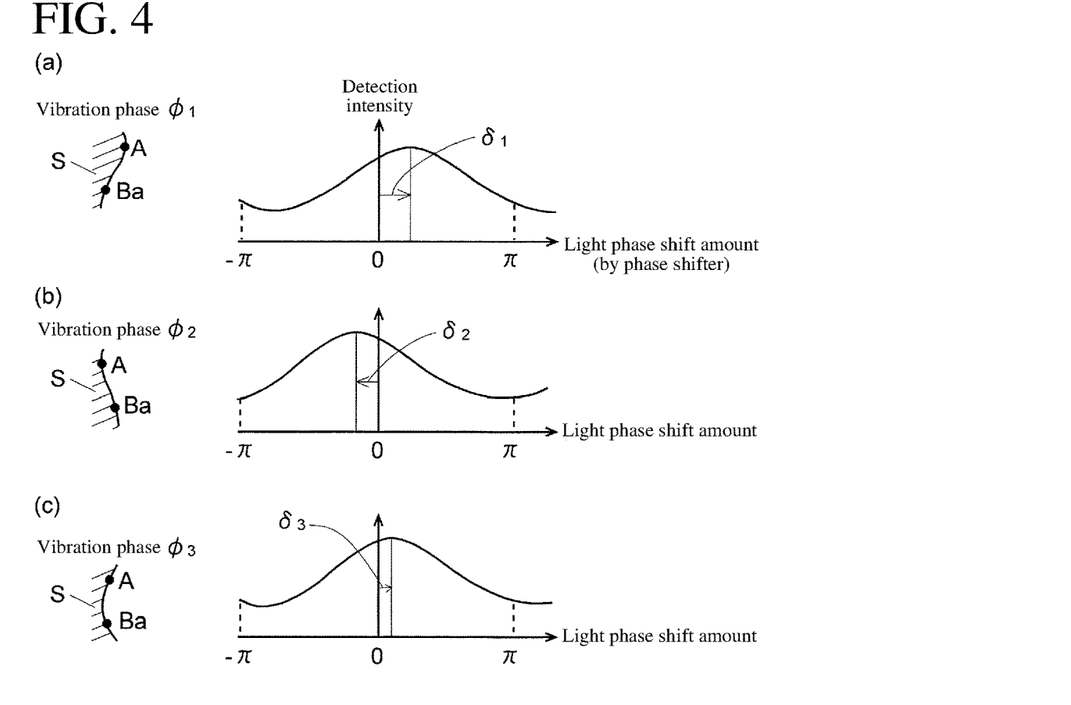
FIG. 4 is a diagram showing three states in which the phase of vibration differs and the intensity changes due to the phase of the interference light obtained in each state, in the displacement detection device of this embodiment.

On the left side of FIG. 4, examples of the vibration state of the elastic wave are shown schematically for the point A in the measurement area R and the point Ba which is one point in the surrounding range of the point A for three distinct states, i.e., the phase of vibration $\varphi_1$, $\varphi_2$, $\varphi_3$ (typically 0, $2\pi/3$, $4\pi/3$). Further, on the right side in the figure, in each of the above-described three states, the difference of the intensity of the main interference light of the light reflected at the point A and the light of the reference light reflected at the point Ba by the phase of the main reflected light changed by the phase shifter 154 is shown. When the phase of vibration is each of the value $\varphi_1$, $\varphi_2$, $\varphi_3$, if the phase of the main reflected light is changed by the phase shifter 154, the intensity of the interference light changes like a function in which a constant value is added to a sine wave. The phase shift amount $\delta_1$, $\delta_2$, $\delta_3$ of the main reflected light when the intensity of the interference light is maximized, which corresponds when the phase of the vibration is (pi, $\varphi_2$, $\varphi_3$, becomes a value reflecting the difference of the relative position in the out-of-plane direction between the point A and the point Ba in the phase of each vibration. Therefore, based on the values of these three phases $\delta_1$, $\delta_2$, $\delta_3$, it is possible to reproduce all the states of vibrations that indicate the relative displacement variations between the point A and the point Ba. Note that, for the sake of simplicity, only one point Ba in the surrounding range has been focused on so far. However, actually, the variation of the relative displacement between the position averaged in the surrounding range and the position of the point A is observed.

Figure 5:
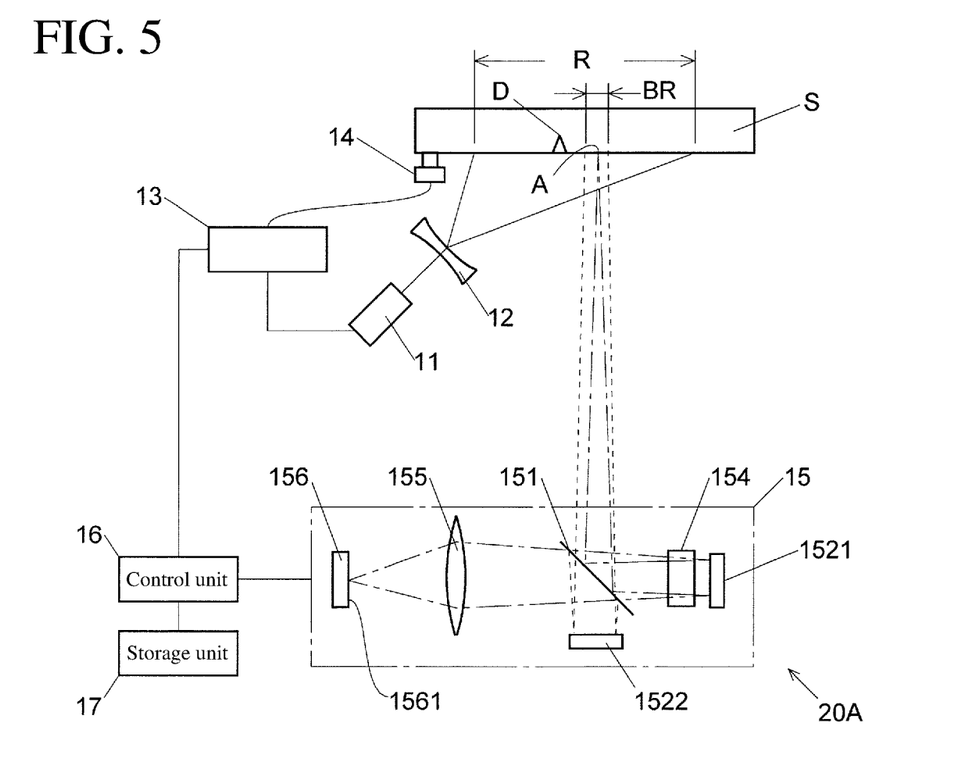
FIG. 5 is a schematic configuration diagram showing a second embodiment of the defect detection device according to the present invention.

(3) Other Embodiments of Displacement Measurement Device and Defect Detection Device Other embodiments of the displacement measurement device and the defect detection device according to the present invention will be described with reference to FIG. 5 and FIG. 6. In the defect detection device 20A of a second embodiment shown in FIG. 5, the diffuser 153 is not provided, and the second reflecting mirror 1522 is arranged at a position closer to the beam splitter 151 than in the defect detection device 20 of the first embodiment. The rest of the configuration is the same as that of the defect detection device 20 of the first embodiment.

By arranging the second reflecting mirror 1522 in this manner, in the non-focusing optical system, the light passed through the beam splitter 151 from the measurement area R of the measurement target object S, reflected by the second reflecting mirror 1522, reflected by the beam splitter 151, passed through the condenser lens 155, and then incident on the detection surface 1561 of the image sensor 156 is condensed to a point on the detection surface 1561 side. While on the measurement area R side, the light focuses at a position behind the measurement area R (on the other side of the beam splitter 151 as seen from the measurement area R). Consequently, the light (the reference light) converged by the non-focusing optical system to one point of the detection surface 1561 becomes the light in which the laser light from the laser light source 11 is reflected in a predetermined range (the surrounding range BR) in the measurement area R. On the other hand, the light incident on one point of the detection surface 1561 by the focusing optical system becomes light reflected at one point in the surrounding range BR in the measurement area R. With this, the intensity of the interference light in which the main reflected light reflected at each point in the measurement area R and the reference light reflected in the surrounding range BR at each point interfere at the detection surface 1561 is detected by the image sensor 156.

Figure 6:
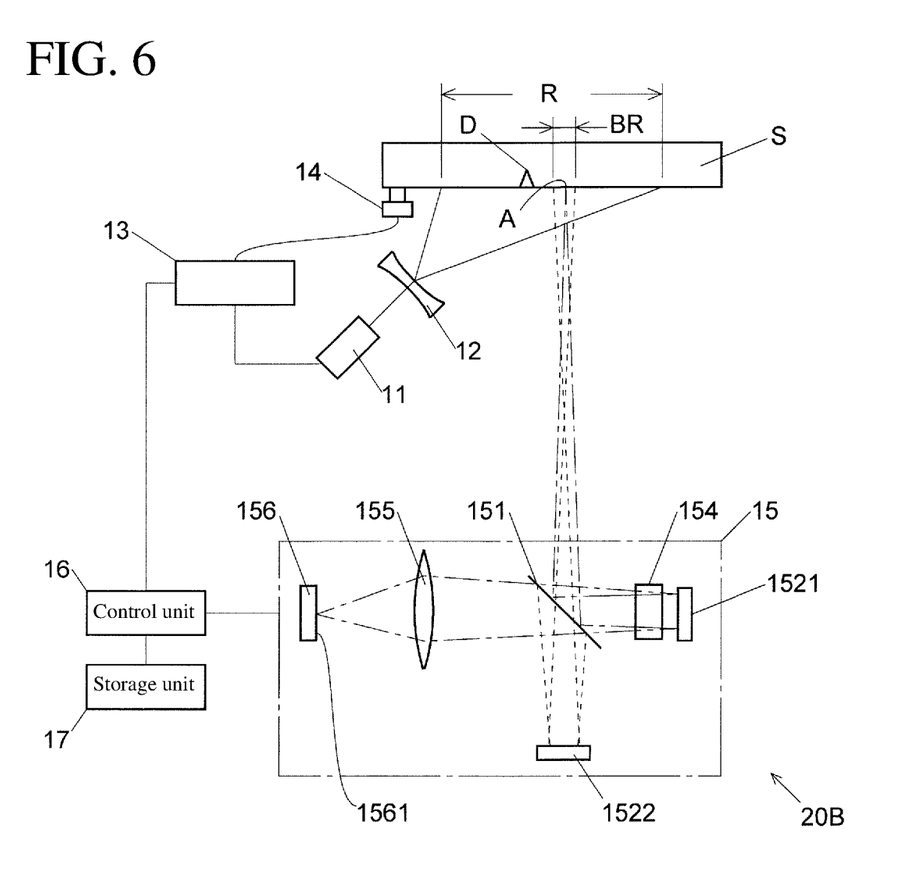
FIG. 6 is a schematic configuration diagram showing a third embodiment of a defect detection device according to the present invention.
Figure 7:
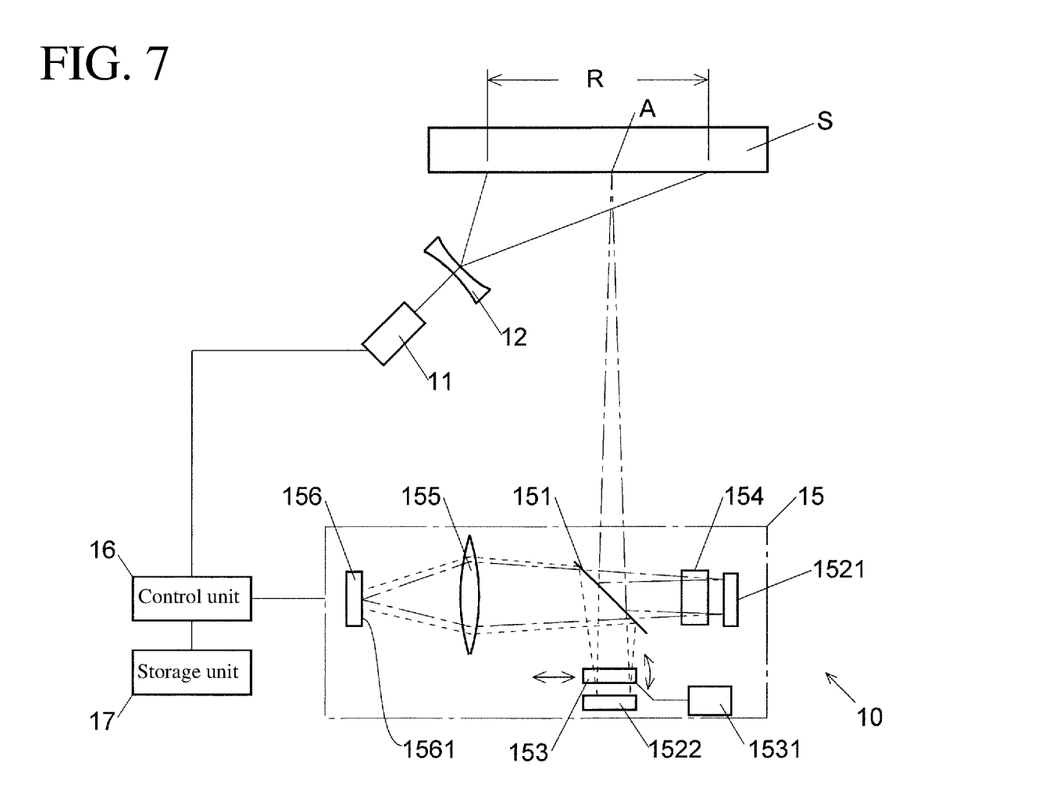
FIG. 7 is a schematic configuration diagram showing a modification of the defect detection device of the first embodiment.

In the defect detection device 20B of the third embodiment shown in FIG. 6, the diffuser 153 is not provided, and the second reflecting mirror 1522 is arranged at a position distant from the beam splitter 151 than in the defect detection device 20 of the first embodiment. Other configurations are the same as those of the defect detection devices 20 and 20A of the first and second embodiments.

By arranging the second reflecting mirror 1522 as described above, in the non-focusing optical system, the light passed through the beam splitter 151 from the measurement area R of the measurement target object S, reflected by the second reflecting mirror 1522, further reflected by the beam splitter 151, passed through the condenser lens 155, and incident on the detection surface 1561 of the image sensor 156 is condensed to one point on the detection surface 1561. On the other hand, on the measurement area R side, the light is focused at the position forward (the beam splitter 151 side as viewed from the measurement area R) than the measurement area R, and in the measurement area R, the light of the surrounding range BR expanded such that the image is inverted to the beam splitter 151 side is focused on the one point of the detection surface 1561 by the non-focusing optical system. With respect to the focusing optical system, similar to the defect detection devices 20 and 20A of the first and second embodiments, the light reflected at one point in the surrounding range BR of the measurement area R is incident on one point of the detection surface 1561. Thus, the intensity of the interference light in which the main reflected light reflected at each point in the measurement area R and the reference light reflected in the surrounding range BR of each point interfere at the detection surface 1561 is detected by the image sensor 156.

Similar to the relation between the defect detection device 20 of the first embodiment and the displacement measurement device 10, in the defect detection device 20A of the second embodiment, by omitting the signal generator 13 and the vibrator 14 and changing to directly control the laser light source 11 by the control unit 16, the displacement measurement device according to the second embodiment is configured. By changing the defect detection device 20B of the third embodiment, the displacement measurement device of the third embodiment can be configured.

It should be noted that the present invention is not limited to the embodiments described above, and various modifications can be made.

For example, in the displacement measurement device 10 and the defect detection device 20 according to the first embodiment, the reference light is randomly diffused by the diffuser 153, and therefore, a speckle (spotty) pattern similar to the interference pattern of the main reflected light and the reference light reflected in an uneven measurement area R is generated separately from the original interference pattern. In order to eliminate the effects of such a speckle pattern, by providing a diffuser (diffusion element) moving mechanism 1531 for moving either one or both of the position and the orientation of the diffuser 153 (in FIG. 7, an example of the displacement measurement device 10 is shown. The same is applied to the defect detection device 20) to the displacement measurement device 10 and the defect detection device 20, it is possible to acquire the interference pattern of the reflected light and the reference light under a plurality of conditions in which the position and/or the orientation of the diffuser 153 differs from each other. Thus, by acquiring a plurality of interference patterns, the original interference pattern by the main reflected light and the reference light has reproducibility, while the speckle pattern derived from the diffuser 153 varies by the position and the orientation of the diffuser 153. Therefore, by averaging the plurality of interference patterns, it is possible to reduce the influence of the speckle pattern derived from the diffuser 153 while maintaining the original interference pattern.

DESCRIPTION OF SYMBOLS

10: Displacement measurement device
11: Laser light source
12: Illumination light lens
13: Signal generator
14: Vibrator
15: Interferometer
151: Beam splitter
1521: First reflecting mirror
1522: Second reflecting mirror
153: Diffuser
1531: Diffuser moving mechanism
154: Phase shifter
155: Condenser lens
156: Image sensor
1561: Detection surface
16: Control unit
17: Storage unit
20, 20A, 20B: Defect detection device
D: Defect
R: Measurement area
S: Measurement target object

The invention claimed is:

1. A displacement measurement device comprising:
   a laser light source configured to emit laser light to a measurement area on a surface of a measurement target object;
   a focusing optical system having a front focal point in the measurement area and a rear focal point on a predetermined imaging surface;
   a non-focusing optical system in which light from a surrounding range of a correspondence point in the measurement area corresponding to each point of the imaging surface with respect to the focusing optical system is incident on the point of the imaging surface; and
   a photodetector configured to detect light intensity on the imaging surface for each point.

2. The displacement measurement device as recited in claim 1,
   wherein the non-focusing optical system includes
   a converging optical system having a front focal point in the measurement area and a rear focal point on the imaging surface, and
   a diffusion element configured to diffuse light, the diffusion element being arranged between the converging optical system and the measurement area or arranged in the converging optical system.

3. The displacement measurement device as recited in claim 2, further comprising:
   a diffusion element moving mechanism configured to change either one or both of a position and an orientation of the diffusion element.

4. A displacement measurement device comprising:
   a laser light source configured to emit laser light to a measurement area on a surface of a measurement target object;
   a focusing optical system having a front focal point in the measurement area and a rear focal point on a predetermined imaging surface;
   a non-focusing optical system having a front focal point in front or rear of the measurement area and a rear focal point on the imaging surface; and
   a photodetector configured to detect light intensity on the imaging surface for each point.

5. A defect detection device comprising:
   an excitation unit configured to excite an elastic wave to a measurement target object;
   a laser light source configured to emit laser light to a measurement area on a surface of the measurement target object;
   a focusing optical system having a front focal point in the measurement area and a rear focal point on a predetermined imaging surface;
   a non-focusing optical system in which light from a surrounding range of a correspondence point in the measurement area corresponding to each point on the imaging surface with respect to the focusing optical system is incident on the point of the imaging surface; and a photodetector configured to detect light intensity on the imaging surface for each point.

6. The defect detection device as recited in claim 5, wherein the non-focusing optical system includes
a converging optical system having the front focal point in the measurement area and the rear focal point on the imaging surface, and
a diffusion element for diffusing light, the diffusion element being arranged between the converging optical system and the measurement area.

7. The defect detection device as recited in claim 6, further comprising:
a diffusion element moving mechanism configured to change either one or both of a position and an orientation of the diffusion element.

8. The defect detection device as recited in claim 5, further comprising:
a control unit configured to perform control of acquiring light intensity of the light from the photodetector in at least three phases mutually different in the elastic wave, by controlling a phase of the elastic wave and a timing of stroboscopic illumination,
wherein the laser light source is configured to perform stroboscopic illumination of laser light to the measurement area.

9. A defect detection device comprising:
an excitation unit configured to excite an elastic wave to a measurement target object;
a laser light source configured to emit laser light to a measurement area on a surface of the measurement target object;
a focusing optical system having a front focal point in the measurement area and a rear focal point on a predetermined imaging surface;
a non-focusing optical system having a front focal point in front or rear of the measurement area and a rear focal point on the imaging surface; and
a photodetector configured to detect light intensity on the imaging surface for each point.

10. The defect detection device as recited in claim 9, further comprising:
a control unit configured to perform control of acquiring light intensity from the photodetector in at least three phases that differ in an elastic wave with each other, by controlling a phase of the elastic wave and a timing of stroboscopic illumination,
wherein the laser light source is configured to perform the stroboscopic illumination of laser light to the measurement area.

* * * * *